United States Patent
Hoang et al.

(10) Patent No.: US 6,340,771 B1
(45) Date of Patent: Jan. 22, 2002

(54) "SWEET" MAO

(75) Inventors: Peter Phung Minh Hoang; Dusan Jeremic; Jason Roy Kearns; Iain McLaren Coulter; Robert D. Donaldson, all of Calgary (CA)

(73) Assignee: Nova Chemicals (International) S. A. (CH)

( * ) Notice: Subject to any disclaimer, the term of this patent is extended or adjusted under 35 U.S.C. 154(b) by 0 days.

(21) Appl. No.: 09/470,569

(22) Filed: Dec. 22, 1999

(51) Int. Cl.[7] .............................. C07F 5/06; C07F 17/00; B01J 31/00
(52) U.S. Cl. ..................... 556/171; 556/187; 502/111; 502/151; 502/152; 502/159; 502/109; 526/160; 526/943
(58) Field of Search ................................. 556/171, 187; 502/152, 151, 159, 111, 109; 526/160, 943

(56) References Cited

U.S. PATENT DOCUMENTS

| | | | | |
|---|---|---|---|---|
| 4,431,788 A | | 2/1984 | Kaminsky | 527/313 |
| 5,198,399 A | * | 3/1993 | Hoff et al. | 502/111 |
| 5,434,116 A | | 7/1995 | Sone et al. | 502/103 |
| 5,547,675 A | | 8/1996 | Canich | 502/117 |
| 5,554,775 A | | 9/1996 | Krishnamurti et al. | 556/7 |
| 5,637,659 A | | 6/1997 | Krishnamurti et al. | 526/133 |
| 5,990,035 A | * | 11/1999 | Koppl et al. | 502/152 |

\* cited by examiner

*Primary Examiner*—Porfirio Nazario-Gonzalez
(74) *Attorney, Agent, or Firm*—Kenneth H. Johnson

(57) ABSTRACT

Aluminoxanes are used as activators for the gas, solution or slurry phase polymerization of olefins in the presence of single site catalysts. Aluminoxanes contain residual aluminum alkyls which may poison the catalysts. The residual aluminum alkyls may be bound an/or removed from the aluminoxanes by treatment with carbohydrates such as cellulose, starch or sugar.

9 Claims, No Drawings

"SWEET" MAO

FIELD OF THE INVENTION

The present invention relates to activators for polymerization catalysts. More particularly the present invention relates to aluminoxane (or alumoxane or polyaluminum oxide) activators which have been treated with a carbohydrate prior to use as activators for polymerization catalysts such as single site catalysts. The present invention also relates to catalyst systems activated with such treated aluminum compounds and to polymerization processes using such treated aluminum compounds.

BACKGROUND OF THE INVENTION

Aluminoxane compounds are known in the art. Generally such compounds may be characterized by the formula I: $R^4{}_2AlO(R^4AlO)_mAlR^4{}_2$ wherein each $R^4$ is independently selected from the group consisting of $C_{1-20}$ hydrocarbyl radicals and m is from 3 to 50, preferably from 5 to 30. Aluminoxane compounds have found use in the polymerization of olefin monomers with single site catalysts such as the bis Cp-type catalysts taught by Exxon Chemical Patents Inc. in a number of patents including for example those by Welborn, Jr., Turner, Hlatky and Canich. The Dow Chemical Company has a number of patents claiming constrained geometry catalysts having a single Cp ligand bridged, typically by a silyl bridge, to another ligand, typically an amido ligand. NOVA Chemicals has filed patents claiming the use of unbridged phosphinimine complexes and ketimide complexes as polymerization catalysts as disclosed by patents in the names of Stephan, Brown, McMeeking, Gao, Spence and Wang. The University of Alberta also has also a number of patents claiming the use of phosphinimine catalysts for the polymerization of olefins such as those in the name of Cavell.

All of the above catalysts may be activated with aluminoxanes or MAO if $R^4$ is a methyl radical. In recent years there have been a number of variants of MAO.

U.S. Pat. No. 5,547,675 issued Aug. 20, 1996 to Canich, assigned to Exxon Chemical Patents Inc. teaches a catalyst system comprising a mono Cp single site catalyst, an aluminoxane and a modifier. The modifier is a Lewis base or a compound containing one or more Lewis base functionalities which are capable of reacting with a Lewis acid such as trimethyl aluminum. A number of representative compounds are then disclosed in the disclosure. The disclosure does not suggest that carbohydrates would be suitable compounds to react with aluminoxanes.

Of interest is U.S. Pat. No. 4,431,788 issued Feb. 14, 1984 to Kaminsky, assigned to CPC International Inc. This patent does not disclose MAO per se. However, the patent discloses a process for making a starch/polyolefin composition by polymerizing the olefin monomer(s) with a cyclopentadienyl containing transition metal catalyst and starch which has been contacted with aluminum trialkyl. The patent does not suggest treating MAO with starch.

The present invention seeks to provide a relatively lower cost alternative to improving the reactivity of aluminoxane than that disclosed in the prior art.

SUMMARY OF THE INVENTION

The present invention provides a process comprising treating a complex aluminum compound of the formula $R^4{}_2AlO(R^4AlO)_mAlR^4{}_2$ wherein each $R^4$ is independently selected from the group consisting of $C_{1-20}$ hydrocarbyl radicals and m is from 3 to 50, with one or more carbohydrates in a weight ratio of aluminum complex to carbohydrate from 1:100 to 100:1 at a temperature from 0° C. to 200° C. for a time of at least 5 minutes.

In a further aspect, the present invention provides a catalyst system comprising a transition metal complex in the presence of an activator comprising an aluminum complex of the formula $R^4{}_2AlO(R^4AlO)_mAlR^4{}_2$ wherein each $R^4$ is independently selected from the group consisting of $C_{1-20}$ hydrocarbyl radicals and m is from 3 to 50 which has been treated with one or more carbohydrates in a weight ratio of aluminum complex to carbohydrate from 1:100 to 100:1 at a temperature from 0° C. to 200° C., to provide a molar ratio of treated aluminum to transition metal from 5:1 to 1000:1.

In a further embodiment, the present invention provides a process for the polymerization of one or more olefins at a temperature from 50° C. to 250° C. in the presence of the above catalyst system.

BEST MODE

Aluminoxane compounds of the present invention have the formula I: $R^4{}_2AlO(R^4AlO)_mAlR^4{}_2$ wherein each $R^4$ is independently selected from the group consisting of $C_{1-20}$ hydrocarbyl radicals and m is from 3 to 50, preferably from 5 to 30. Most preferably $R^4$ is selected from the group consisting of $C_{1-6}$, most preferably $C_{1-4}$ straight chained or branched alkyl radicals. Suitable alkyl radicals include a methyl radical, an ethyl radical, an isopropyl radical and an isobutyl radical. In some commercially available aluminoxanes $R^4$ is a methyl radical.

Carbohydrates comprise a broad class of organic chemicals typically having the empirical formula $(CH_2O)_n$. Carbohydrates may be monosaccharides, disaccharides, oligosaccharides and polysaccharides.

Typically the monosaccharides are polyhydroxy aldehydes or ketones or derivatives thereof. Typical monosaccharides comprise from 3 to 6 carbon atoms ($C_{3-6}$) polyhydroxy aldehydes or ketones (i.e. n is 3 to 6). The higher carbon monosaccharides, having 4 or more carbon atoms, may also form ring structures. The monosaccharides have chiral centers and have D- and L- forms. Some of the common monosaccharides include glyceraldehyde, erythrose, thresoe, arabinose, ribose, lyxose, xylose, glucose, mannose, altrose, allose, talose, galactose, idose and gluose. The five and six membered rings may be referred to as furanose and pyranose based on the parent ring structure of either furan (5-membered cyclic ether) or pyran (6-membered cyclic ether).

As the monosaccharides have multiple hydroxyl groups it is also possible to react monosaccharides together (typically by a linkage between the 1 and 4 carbon atoms in the reacting monosaccharides) to produce poly-, oligo- or disaccharides. The disaccharides may be formed by the reaction between two identical monosaccharides as in maltose or two different monosaccharides as in sucrose and lactose.

The oligosaccharides typically comprise from 2 to 10 monosaccharide units. If the oligosaccharide contains only one type of monosaccharide it is a homopolymer, and if the oligosaccharide contains two or more different monosaccharides it is a heteropolymer. Some oligosaccharides include stachyose (a tetrasaccharide), maltopentose (a 5-membered oligosaccharide) and cyclomaltohexaose (a 6-membered cyclic oligosaccharide).

The polysaccharides contain higher numbers of monosaccharide units. The polysaccharides may be linear or branched. In the backbone of the polysaccharide the linkages between monosaccharide units are typically between the 1-carbon and the 4-carbon of adjacent monosaccharide units. The branches are joined to the backbone through 1-carbon (on first monosaccharide on the branch) to 6-carbon (pendant from the monosaccharide of the backbone). Polysaccharides comprising only one type of monosaccharide unit are homoglycans. Polysaccharides comprising two or more monosaccharides are heteroglycans. Heteroglycans may be characterized by the number of different monosaccharide units in the polymer. Polymers of two different monosaccharides are diheteroglycans. Polymers of three different monosaccharides are triheteroglycans. Common unbranched (linear) polysaccharides include cellulose and amylose. A common branched polysaccharide is amylopectin. Cellulose, amylose and amylopectin are all homoglycans. Starch is a mixture of amylose (linear polysaccharide) and amylopectin (a branched polysaccharide) in a weight ratio of about 25 to 85 weight % of linear polysaccharide and 75 to 15 weight % of branched polysaccharide. Waxy starch consists essentially of branched polysaccharides.

In treating the aluminoxane in accordance with the present invention, the weight ratio of carbohydrate to aluminoxane may be from 1:100 to 100:1, preferably from 1:25 to 25:1. The temperature of the treatment may be from 0° C. to 200° C. Typically the temperature is above 20° C.

The treatment may be for a time of at least 5 minutes up to 24 hours. The treatment may be as long as several (e.g. 3 to 5 or more) days. Typically the time of treatment is from about 30 minutes to 16 hours. Generally, the treatment takes place in an inert diluent or solvent preferably under an inert atmosphere, preferably nitrogen. Care should be taken to avoid contacting the aluminoxane with water.

After treatment, the aluminoxane may be treated to remove insoluble carbohydrate. However, there may be some instances where the carbohydrate is soluble or of a particle size which will not detrimentally affect the polymerization. If the aluminoxane is treated to remove insoluble carbohydrate it may typically be filtered or decanted. The resulting aluminoxane (filtrate or decantate) may then be used in the polymerization reaction.

Aluminoxane may be used with transition metal catalysts for the polymerization of olefins. The transition metal may be an early or late transition metal. Some transition metals are Ti, V, Zr, Hf, Cr, Fe, Co, Ni and Pd.

Typically the catalysts used with the aluminoxane, prepared in accordance with the present invention, comprise a transition metal complex of at least one $C_{5-13}$ ligand containing a 5-membered carbon ring having delocalized bonding within the ring and bound to the metal atom through covalent η5 bonds; and said ligand being unsubstituted or up to fully substituted with one or more substituents as described below.

Generally the catalyst may be a single site type catalyst typically comprising a transition metal, preferably an early transition metal (e.g. Ti, V, Zr and Hf) and generally having two bulky ligands. In many of the well known single site catalysts typically one of the bulky ligands is a cyclopentadienyl-type ligand. These cyclopentadienyl-type ligands comprise a $C_{5-13}$ ligand containing a 5-membered carbon ring having delocalized bonding within the ring and bound to the metal atom through covalent η5 bonds which are unsubstituted or may be further substituted (sometimes referred to in a short form as Cp ligands). Cyclopentadienyl-type ligands include unsubstituted cyclopentadienyl, substituted cyclopentadienyl, unsubstituted indenyl, substituted indenyl, unsubstituted fluorenyl and substituted fluorenyl. An exemplary list of substituents for a cyclopentadienyl-type ligand includes the group consisting of $C_{1-10}$ hydrocarbyl radicals (including phenyl and benzyl radicals), which hydrocarbyl substituents are unsubstituted or further substituted by one or more substituents selected from the group consisting of a halogen atom, preferably a chlorine or fluorine atom and a $C_{1-4}$ alkyl radical; a $C_{1-8}$ alkoxy radical; a $C_{6-10}$ aryl or aryloxy radical; an amido radical which is unsubstituted or substituted by up to two $C_{1-8}$ alkyl radicals; a phosphido radical which is unsubstituted or substituted by up to two $C_{1-8}$ alkyl radicals; silyl radicals of the formula— Si—$(R)_3$ wherein each R is independently selected from the group consisting of hydrogen, a $C_{1-8}$ alkyl or alkoxy radical, and $C_{6-10}$ aryl or aryloxy radicals; and germanyl radicals of the formula Ge—$(R)_3$ wherein R is as defined directly above.

If there are two such bulky ligands (i.e. bis Cp) the catalysts are metallocene-type catalysts. The Cp ligand may be bridged to another Cp ligand by a silyl bridge or a short chain $(C_{1-4})$ alkyl radical. The Cp-type ligand may be bridged to an amido radical which may be further substituted by up to two additional substituents. Such bridged complexes are sometimes referred to as constrained geometry catalysts.

Broadly, the transition metal complex (or catalyst) suitable for use in the present invention has the formula:

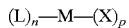

wherein M is a transition metal preferably selected from Ti, Hf and Zr (as described below); L is a monoanionic ligand selected from the group consisting of a cyclopentadienyl-type ligand, a bulky heteroatom ligand (as described below) and a phosphinimine ligand (as described below); X is an activatable ligand which is most preferably a simple monoanionic ligand such as alkyl or a halide (as described below); n may be from 1 to 3, preferably 2 or 3; and p may be from 1 to 3, preferably 1 or 2, provided that the sum of n+p equals the valence state of M, and further provided that two L ligands may be bridged by a silyl radical or a $C_{1-4}$ alkyl radical.

If one or more of the L ligands is a phosphinimine ligand the transition metal complex may be of the formula:

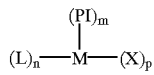

wherein M is a transition metal preferably selected from Ti, Hf and Zr (as described below); Pl is a phosphinimine ligand (as described below); L is a monoanionic ligand selected from the group consisting of a cyclopentadienyl-type ligand or a bulky heteroatom ligand (as described below); X is an activatable ligand which is most preferably a simple monoanionic ligand such as an alkyl or a halide (as described below); m is 1 or 2; n is 0 or 1; and p is an integer fixed by the valence of the metal M (i.e. the sum of m+n+p equals the valence state of M).

In one embodiment the catalysts are Group 4 metal complexes in the highest oxidation state. For example, the catalyst may be a bis (phosphinimine) dichloride complex of titanium, zirconium or hafnium. Alternately, the catalyst contains one phosphinimine ligand, one "L" ligand (which is most preferably a cyclopentadienyl-type ligand) and two "X" ligands (which are preferably both chloride).

The preferred metals (M) are from Group 4, (especially titanium, hafnium or zirconium) with titanium being most preferred.

The catalyst may contain one or two phosphinimine ligands which are covalently bonded to the metal. The phosphinimine ligand is defined by the formula:

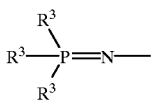

wherein each $R^3$ is independently selected from the group consisting of a hydrogen atom; a halogen atom; $C_{1-20}$, preferably $C_{1-10}$ hydrocarbyl radicals which are unsubstituted by or further substituted by a halogen atom; a $C_{1-8}$ alkoxy radical; a $C_{6-10}$ aryl or aryloxy radical; an amido radical; a silyl radical of the formula:

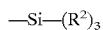

wherein each $R^2$ is independently selected from the group consisting of hydrogen, a $C_{1-8}$ alkyl or alkoxy radical, and $C_{6-10}$ aryl or aryloxy radicals; and a germanyl radical of the formula:

wherein $R^2$ is as defined above.

The preferred phosphinimines are those in which each $R^3$ is a hydrocarbyl radical, preferably a $C_{1-6}$ hydrocarbyl radical.

Preferred phosphinimine catalysts are Group 4 organometallic complexes which contain one phosphinimine ligand (as described above) and one ligand L which is either a cyclopentadienyl-type ligand or a heteroligand.

As used herein, the term "heteroligand" refers to a ligand which contains at least one heteroatom selected from the group consisting of boron, nitrogen, oxygen, phosphorus or sulfur. The heteroligand may be sigma or pi-bonded to the metal. Exemplary heteroligands include ketimide ligands, silicone-containing heteroligands, amido ligands, alkoxy ligands, boron hetrocyclic ligands and phosphole ligands, as all described below.

As used herein, the term "ketimide ligand" refers to a ligand which:

(a) is bonded to the transition metal via a metal-nitrogen atom bond;

(b) has a single substituent on the nitrogen atom, (where this single substituent is a carbon atom which is doubly bonded to the N atom); and (c) has two substituents Sub 1 and Sub 2 (described below) which are bonded to the carbon atom.

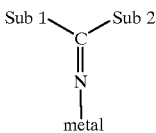

The substituents "Sub 1" and "Sub 2" may be the same or different. Exemplary substituents include hydrocarbyls having from 1 to 20 carbon atoms, silyl groups, amido groups and phosphido groups. For reasons of cost and convenience it is preferred that these substituents both be hydrocarbyls, especially simple alkyls and most preferably tertiary butyl.

Silicon containing hetroligands are defined by the formula:

wherein the—denotes a bond to the transition metal and $\mu$ is sulfur or oxygen.

The substituents on the Si atom, namely $R_x$, $R_y$ and $R_z$ are required in order to satisfy the bonding orbital of the Si atom. The use of any particular substituent $R_x$, $R_y$ or $R_z$ is not especially important to the success of this invention. It is preferred that each of $R_x$, $R_y$ and $R_z$ is a $C_{1-2}$ hydrocarbyl group (i.e. methyl or ethyl) simply because such materials are readily synthesized from commercially available materials.

The term "amido" is meant to convey its broad, conventional meaning. Thus, these ligands are characterized by (a) a metal-nitrogen bond and (b) the presence of two substituents (which are typically simple alkyl or silyl groups) on the nitrogen atom.

The terms "alkoxy" and "aryloxy" is also intended to convey its conventional meaning. Thus, these ligands are characterized by (a) a metal oxygen bond and (b) the presence of a hydrocarbyl group bonded to the oxygen atom. The hydrocarbyl group may be a $C_{1-10}$ straight chained, branched or cyclic alkyl radical or a $C_{6-13}$ aromatic radical which radicals are unsubstituted or further substituted by one or more $C_{1-4}$ alkyl radicals (e.g. 2, 6 di-tertiary butyl phenoxy).

Boron heterocyclic ligands are characterized by the presence of a boron atom in a closed ring ligand. This definition includes heterocyclic ligands which also contain a nitrogen atom in the ring. These ligands are well known to those skilled in the art of olefin polymerization and are fully described in the literature (see, for example, U.S. Pat. Nos. 5,637,659; 5,554,775 and the references cited therein).

The term "phosphole" is also meant to convey its conventional meaning. "Phospholes" are cyclic dienyl structures having four carbon atoms and one phosphorus atom in the closed ring. The simplest phosphole is $C_4PH_4$ (which is analogous to cyclopentadiene with one carbon in the ring being replaced by phosphorus). The phosphole ligands may be substituted with, for example, $C_{1-20}$ hydrocarbyl radicals (which may, optionally, contain halogen substituents); phosphido radicals; amido radicals; or silyl or alkoxy radicals. Phosphole ligands are also well known to those skilled in the art of olefin polymerization and are described as such in U.S. Pat. No. 5,434,116 (Sone, to Tosoh).

The term "activatable ligand" or "leaving ligand" refers to a ligand which may be activated by the aluminoxane, (also referred to as an "activator"), to facilitate olefin polymerization. Exemplary activatable ligands are independently selected from the group consisting of a hydrogen atom; a halogen atom, preferably a chlorine or fluorine atom; a $C_{1-10}$ hydrocarbyl radical, preferably a $C_{1-4}$ alkyl radical; a $C_{1-10}$ alkoxy radical, preferably a $C_{1-4}$ alkoxy radical; and a $C_{5-10}$ aryl oxide radical; each of which said hydrocarbyl, alkoxy, and aryl oxide radicals may be unsubstituted by or further substituted by one or more substituents selected from the group consisting of a halogen atom, preferably a chlorine or fluorine atom; a $C_{1-8}$ alkyl radical, preferably a $C_{1-4}$ alkyl radical; a $C_{1-8}$ alkoxy radical, preferably a $C_{1-4}$ alkoxy radical; a $C_{6-10}$ aryl or aryloxy radical; an amido radical which is unsubstituted or substituted by up to two $C_{1-8}$, preferably $C_{1-4}$ alkyl radicals; and a phosphido radical which is unsubstituted or substituted by up to two $C_{1-8}$, preferably $C_{1-4}$ alkyl radicals.

The number of activatable ligands depends upon the valency of the metal and the valency of the activatable ligand. The preferred catalyst metals are Group 4 metals in their highest oxidation state (i.e. 4+) and the preferred activatable ligands are monoanionic (such as a halide— especially chloride or $C_{1-4}$ alkyl—especially methyl). One useful group of catalysts contain a phosphinimine ligand, a cyclopentadienyl ligand and two chloride (or methyl) ligands bonded to the Group 4 metal. In some instances, the metal of the catalyst component may not be in the highest oxidation state. For example, a titanium (III) component would contain only one activatable ligand.

As noted above, one group of catalysts is a Group 4 organometallic complex in its highest oxidation state having a phosphinimine ligand, a cyclopentadienyl-type ligand and two activatable ligands. These requirements may be concisely described using the following formula for the preferred catalyst:

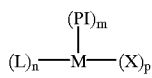

wherein: M is a metal selected from Ti, Hf and Zr; Pl is as defined above, but preferably a phosphinimine wherein $R^3$ is a $C_{1-6}$ alkyl radical, most preferably a t-butyl radical; L is a ligand selected from the group consisting of cyclopentadienyl, indenyl and fluorenyl ligands which are unsubstituted or substituted by one or more substituents selected from the group consisting of a halogen atom, preferably chlorine or fluorine; $C_{1-4}$ alkyl radicals; and benzyl and phenyl radicals which are unsubstituted or substituted by one or more halogen atoms, preferably fluorine; X is selected from the group consisting of a chlorine atom and $C_{1-4}$ alkyl radicals; m is 1; n is 1; and p is 2.

In one embodiment of the present invention the transition metal complex may have the formula: $[(Cp)_qM[N=P(R^3)]_bX_c$ wherein M is the transition metal; Cp is a $C_{5-13}$ ligand containing a 5-membered carbon ring having delocalized bonding within the ring and bound to the metal atom through covalent $\eta^5$ bonds and said ligand being unsubstituted or up to fully substituted with one or more substituents selected from the group consisting of a halogen atom, preferably chlorine or fluorine; $C_{1-4}$ alkyl radicals; and benzyl and phenyl radicals which are unsubstituted or substituted by one or more halogen atoms, preferably fluorine; $R^3$ is a substituent selected from the group consisting of $C_{1-10}$ straight chained or branched alkyl radicals, $C_{6-10}$ aryl and aryloxy radicals which are unsubstituted or may be substituted by up to three $C_{1-4}$ alkyl radicals, and silyl radicals of the formula —Si—(R)$_3$ wherein R is $C_{1-4}$ alkyl radical or a phenyl radical; L is selected from the group consisting of a leaving ligand; q is 1 or 2; b is 1 or 2; and the valence of the transition metal—(q+b)=c.

The polymerization in accordance with the present invention may be conducted in a liquid phase as either a slurry or solution polymerization conducted in an inert diluent or solvent, or a gas phase polymerization. The difference between slurry and solution polymerization being whether the resulting polymer is soluble in the liquid phase.

The catalyst systems of the present invention may further be supported on a refractory support or an organic support (including polymeric support). That is either the transition metal complex or the treated aluminoxane compound or both may be supported on a refractory support or an organic support (e.g. polymeric). Some refractories include silica which may be treated to reduce surface hydroxyl groups and alumina. The support or carrier may be a spray-dried silica. Generally the support will have an average particle size from about 0.1 to about 1000, preferably from about 10 to 150 microns. The support typically will have a surface area of at least about 50 m²/g, preferably from about 150 to 1500 m2/g. The pore volume of the support should be at least 0.2, preferably greater than 0.6 cm³/g.

If the support is silica it may be dried by heating at a temperature of at least about 100° C., for at least 2 hours, preferably from about 2 to 24 hours under an inert atmosphere. In an alternate treatment, the excess surface hydroxyl radicals may be removed by chemical reaction with a reactive species. Suitable reactive species include metal alkyls, including magnesium alkyls, lithium alkyls and aluminum alkyls. It should be noted that as the carbohydrate used in accordance with the present invention could react with metal alkyls, the support should be treated with the metal alkyls prior to contact with the aluminoxane. It is also reasonably apparent to one skilled in the art if the silica has been treated with metal alkyls a carryover of some carbohydrate (e.g. soluble carbohydrate) may also remove any free metal alkyls which may be present (adsorbed) on the support.

Solution and slurry polymerization processes are fairly well known in the art. These processes are conducted in the presence of an inert hydrocarbon solvent typically a $C_{4-12}$ hydrocarbon which may be unsubstituted or substituted by a $C_{1-4}$ alkyl group such as butane, pentane, hexane, heptane, octane, cyclohexane, methylcyclohexane or hydrogenated naphtha. An additional solvent is Isopar E ($C_{8-12}$ aliphatic solvent, Exxon Chemical Co.).

The polymerization may be conducted at temperatures from about 20° C. to about 250° C. Depending on the product being made, this temperature may be relatively low such as from 20° C. to about 180° C., typically from about 80° C. to 150° C. and the polymer is insoluble in the liquid hydrocarbon phase (diluent) (e.g. a slurry polymerization). The reaction temperature may be relatively higher from about 180° C. to 250° C., preferably from about 180° C. to 230° C. and the polymer is soluble in the liquid hydrocarbon phase (solvent). The pressure of the reaction may be as high as about 15,000 psig for the older high pressure processes or may range from about 15 to 4,500 psig.

In the gas phase polymerization of a gaseous mixture comprising from 0 to 15 mole % of hydrogen, from 0 to 30 mole % of one or more $C_{3-8}$ alpha-olefins, from 15 to 100 mole % of ethylene, and from 0 to 75 mole % of an inert gas at a temperature from 50° C. to 120° C., preferably from 75° C. to about 110° C., and at pressures typically not exceeding 3447 kPa (about 500 psi), preferably not greater than 2414 kPa (about 350 psi).

Suitable olefin monomers may be ethylene and $C_{3-20}$ mono- and di-olefins. Preferred monomers include ethylene and $C_{3-12}$ alpha olefins which are unsubstituted or substituted by up to two $C_{1-6}$ alkyl radicals. Illustrative non-limiting examples of such alpha olefins are one or more of propylene, 1-butene, 1-pentene, 1-hexene, 1-heptene, 1-octene and 1-decene. The polymers prepared in accordance with the present invention have a good molecular weight. That is, weight average molecular weight (Mw) will preferably be greater than about 30,000 ranging up to $10^7$, preferably $10^5$ to $10^7$. Hydrogen may be used in the polymerization to control the molecular weight of the polymer.

The polyethylene polymers which may be prepared in accordance with the present invention typically comprise not less than 60, preferably not less than 70, most preferably not less than 80, weight % of ethylene and the balance of one or more $C_{4-10}$ alpha olefins, preferably selected from the group consisting of 1-butene, 1-hexene and 1-octene.

The present invention will now be illustrated by the following non-limiting examples. In the examples unless otherwise indicated parts means part by weight (i.e. grams) and percent means weight percent.

EXAMPLES

Catalyst Preparation

Catalyst 1

In a round bottom flask, 2.0 g of silica (Davison XPO-2408), dehydrated at 200° C. in air for 2 hours and at 600° C. under nitrogen for 6 hours was slurried in approximately 10 mL of dried toluene. 2.42 g of an aluminoxane (methyl) solution (13.75 weight % Al in toluene) was added into the flask. The slurry was stirred overnight at room temperature. 46 mg of tri-tert-butyl phosphiniminate indenyl titanium dichloride was dissolved in 10 mL of toluene and added slowly into the slurry which was subsequently stirred for 2 hours at room temperature and further for 2 hours at 45° C. The solvent was removed by filtration and the solid washed three times with n-hexane and vacuum dried.

Catalyst 2

The procedure followed is the same as Catalyst 1, except that the aluminoxane solution used in this catalyst preparation was pre-treated with cellulose by stirring 12.1 g of the aluminoxane solution with 0.5 g of cellulose overnight at room temperature, followed by the removal of cellulose by filtration.

Catalyst 3

The procedure followed is the same as Catalyst 2, except that 1.0 g of cellulose was used to pre-treat 12.1 g of the aluminoxane solution.

Polymerization Results

Polymerization 1

160 g of NaCl was added into a 2-litre autoclave reactor for use as a seedbed. The reactor was heated to 100° C. and thoroughly purged with ethylene gas. Approximately 0.40 mL of tri-isobutyl aluminum in n-hexane solution (0.40 mmol) and 3 mL of 1-hexene were injected into the reactor. After the reactor was cooled down to 90° C. and pressurized with 100 psig ethylene, 9 mg of Catalyst 1 was added and the reactor was pressurized with 200 psig ethylene. The polymerization proceeded for 60 minutes with the temperature maintained at 90° C. and the pressure at 200 psig. The reaction was terminated by rapidly venting the reaction gases and cooling the reactor to room temperature. The polymer yield was 38.0 g.

Polymerization 2

The reaction was carried out as in Polymerization 1, except that 10 mg of Catalyst 2 was used instead of 9 mg Catalyst 1. The polymer yield was 50.0 g.

Polymerization 3

The reaction was carried out as in Polymerization 1, except that 8 mg of Catalyst 3 was used instead of 9 mg of Catalyst 1. The polymer yield was 45.6 g.

What is claimed is:

1. A process comprising treating a complex aluminum compound of the formula $R^4{}_2AlO(R^4AlO)_m AlR^4{}_2$ wherein each $R^4$ is independently selected from the group consisting of $C_{1-20}$ hydrocarbyl radicals and m is from 3 to 50, with one or more carbohydrates in a weight ratio of aluminum complex to carbohydrate from 1:100 to 100:1 at a temperature from 0° C. to 200° C. for a time of at least 5 minutes.

2. The process according to claim 1, wherein the carbohydrate is selected from the group consisting of monosaccharides and polysaccharides.

3. The process according to claim 2, wherein in the aluminum complex $R^4$ is a $C_{1-4}$ alkyl radical and m is from 5 to 30.

4. The process according to claim 3, wherein the weight ratio of aluminum complex to carbohydrate is from 1:25 to 25:1.

5. The process according to claim 4, wherein the carbohydrate is a $C_{3-6}$ monosaccharide.

6. The process according to claim 4, wherein the carbohydrate is a polysaccharide.

7. The process according to claim 6, wherein the polysaccharide is a homoglycan polysaccharide.

8. The process according to claim 7, wherein the homoglycan polysaccharide is unbranched.

9. The process according to claim 8, wherein the homoglycan polysaccharide is cellulose.

* * * * *